(12) United States Patent
Cipollone

(10) Patent No.: US 7,836,083 B2
(45) Date of Patent: Nov. 16, 2010

(54) INTELLIGENT SEARCH AND RETRIEVAL SYSTEM AND METHOD

(75) Inventor: Peter M. Cipollone, Princeton Junction, NJ (US)

(73) Assignee: Factiva, Inc., Monmouth Junction, NJ (US)

( * ) Notice: Subject to any disclaimer, the term of this patent is extended or adjusted under 35 U.S.C. 154(b) by 0 days.

(21) Appl. No.: 11/060,928

(22) Filed: Feb. 18, 2005

(65) Prior Publication Data

US 2005/0187923 A1    Aug. 25, 2005

Related U.S. Application Data

(60) Provisional application No. 60/546,658, filed on Feb. 20, 2004.

(51) Int. Cl.
*G06F 7/00* (2006.01)
(52) U.S. Cl. .................................. 707/792; 341/50
(58) Field of Classification Search ............... 707/2–5, 707/999.2, 792
See application file for complete search history.

(56) References Cited

U.S. PATENT DOCUMENTS

| | | | |
|---|---|---|---|
| 5,542,090 A | | 7/1996 | Henderson et al. |
| 5,754,939 A | * | 5/1998 | Herz et al. .................. 455/3.04 |
| 5,924,090 A | * | 7/1999 | Krellenstein .................... 707/5 |
| 5,960,422 A | | 9/1999 | Prasad |
| 6,038,561 A | | 3/2000 | Snyder et al. |
| 6,067,552 A | | 5/2000 | Yu |
| 6,233,575 B1 | * | 5/2001 | Agrawal et al. ................ 707/6 |
| 6,260,041 B1 | | 7/2001 | Gonzalez et al. |

(Continued)

OTHER PUBLICATIONS

Yiming Yang and Christopher G. Chute, "An Example-Based Mapping Method for Text Categorization and Retrieval", ACM Transactions on Information Systems, vol. 12, No. 3, Jul. 1994, pp. 252-277.

(Continued)

*Primary Examiner*—Apu M Mofiz
*Assistant Examiner*—Mohammad N Rahman
(74) *Attorney, Agent, or Firm*—Dorsey & Whitney LLP

(57) ABSTRACT

An intelligent search and retrieval system and method is provided to allow an end-user effortless access yet most relevant, meaningful, up-to-date, and precise search results as quickly and efficiently as possible. The method may include providing a query profiler having a taxonomy database; receiving a query from a user; accessing the taxonomy database of the query profiler to identify a plurality of codes that are relevant to the query; augmenting the query using the codes to generate feedback information to the user for query refinement, the feedback information including a plurality of query terms associated with the query and to be selected by the user; presenting the feedback information to the user; receiving one of the query terms from the user; and identifying a source of the query term and presenting to the user. The system may include a query profiler having a taxonomy database to be accessed upon receiving a query from a user, which identifies a plurality of codes that are relevant to the query; means for augmenting the query using the codes to generate feedback information to the user for query refinement, the feedback information including a plurality of query terms associated with the query and to be selected by the user; and means for identifying a source of the query term, upon receiving one of the query terms from the user.

3 Claims, 3 Drawing Sheets

U.S. PATENT DOCUMENTS

| | | | |
|---|---|---|---|
| 6,292,830 B1 | 9/2001 | Taylor et al. | |
| 6,332,141 B2 | 12/2001 | Gonzalez et al. | |
| 6,418,433 B1 * | 7/2002 | Chakrabarti et al. | 707/5 |
| 6,711,585 B1 | 3/2004 | Copperman et al. | |
| 6,735,583 B1 | 5/2004 | Bjarnestam et al. | |
| 6,868,525 B1 | 3/2005 | Szabo | |
| 6,873,990 B2 | 3/2005 | Oblinger | |
| 6,961,737 B2 | 11/2005 | Ritchie et al. | |
| 7,035,864 B1 | 4/2006 | Ferrari et al. | |
| 7,146,361 B2 * | 12/2006 | Broder et al. | 707/5 |
| 7,266,548 B2 | 9/2007 | Weare | |
| 2001/0000356 A1 | 4/2001 | Woods | |
| 2002/0087565 A1 | 7/2002 | Hoekman et al. | |
| 2003/0014405 A1 | 1/2003 | Shapiro et al. | |
| 2003/0154196 A1 * | 8/2003 | Goodwin et al. | 707/3 |
| 2003/0172059 A1 | 9/2003 | Andrei | |
| 2003/0212666 A1 | 11/2003 | Basu et al. | |
| 2003/0217052 A1 * | 11/2003 | Rubenczyk et al. | 707/3 |
| 2004/0024790 A1 * | 2/2004 | Everett | 707/200 |
| 2004/0060426 A1 | 4/2004 | Weare et al. | |
| 2004/0267718 A1 * | 12/2004 | Milligan et al. | 707/3 |
| 2005/0060312 A1 | 3/2005 | Curtiss et al. | |
| 2005/0097075 A1 | 5/2005 | Hoekman et al. | |
| 2005/0187923 A1 | 8/2005 | Cipollone | |

OTHER PUBLICATIONS

George W. Furnas et al., "Information Retrieval using a Singular Value Decomposition Model of Latent Semantic Structure", Proceedings of the International Conference on Research and Development in Information Retrieval, Jun. 13, 1998, pp. 465-480.

Fuhr et al. "A Probabilistic Learning Approach for Document Indexing" ACM Transactions on Information Systems, vol. 9, No. 3, Jul. 1991, pp. 223-248, XP000951621, USA.

Maynard et al. "Identifying terms by their family and friends" proceedings of the 18th Conference on Computational Linguistics, 2000, p. 530-536, Saarbrücken, Germany, 2000.

* cited by examiner

Graphical View of the Phrase-Code Pair Scoring Calculation

INTELLIGENT SEARCH AND RETRIEVAL SYSTEM AND METHOD

CROSS-REFERENCE TO RELATED APPLICATION(S)

This application claims the benefit of U.S. Provisional application No. 60/546,658, entitled "Intelligent Search and Retrieval System And Method", filed on Feb. 20, 2004, the subject matter of which is hereby incorporated by reference herein in its entirety.

FIELD OF THE INVENTION

The present invention relates generally to a search and retrieval system, and more particularly, to an intelligent search and retrieval system and method.

BACKGROUND OF THE INVENTION

Existing comprehensive search and retrieval systems have been principally designed to provide services for "Information Professionals", such as professional searchers, librarians, reference desk staff, etc. These information professionals generally have a significant amount of training and experience in drafting complex focused queries for input into these information service systems and are able to understand and use the many features available in the various existing comprehensive search and retrieval systems.

However, with the explosive increase in the quantity, quality, availability, and ease-of-use of Internet-based search engines such as Google, AltaVista, Yahoo Search, Wisenut, etc., there is a new population of users familiar with these Internet based search products who now expect similar ease-of-use, simple query requirements and comprehensive results from all search and retrieval systems. This new population may not necessarily be, and most likely are not, information professionals with a significant amount of training and experience in using comprehensive information search and retrieval systems. The members of this new population are often referred to as "end-users." The existing comprehensive search and retrieval systems generally place the responsibility on an end-user to define all of the search, retrieval and presentation features and principles before performing a search. This level of complexity is accessible to information professionals, but often not to end-users. Presently, end-users typically enter a few search terms and expect the search engine to deduce the best way to normalize, interpret and augment the entered query, what content to run the query against, and how to sort, organize, and navigate the search results. The end-users expect search results and corresponding document display to be based upon their limited search construction instead of the comprehensive taxonomies upon which information professionals rely when using comprehensive search engines. End-users have grown to expect simplistic queries to produce precise, comprehensive search results, while (not realistically) expecting their searches to be as complete as those run by information professionals using complex queries.

Therefore, there is a need in the art to have an intelligent comprehensive search and retrieval system and method capable of providing an end-user effortless access yet the most relevant, meaningful, up-to-date, and precise search results as quickly and efficiently as possible.

SUMMARY OF THE INVENTION

The present invention provides an intelligent search and retrieval system and method capable of providing an end-user access utilizing simplistic queries and yet the most relevant, meaningful, up-to-date, and precise search results as quickly and efficiently as possible.

In one embodiment of the present invention, an intelligent search and retrieval method comprises the steps of:
  providing a query profiler having a taxonomy database;
  receiving a query from a user;
  accessing the taxonomy database of the query profiler to identify a plurality of codes that are relevant to the query;
  augmenting the query using the codes to generate feedback information, the feedback information including a plurality of query terms associated with the query;
  receiving one of the query terms; and
  identifying a source of the query term and presenting to the user.

In another embodiment of the present invention, an intelligent search and retrieval method comprises the steps of:
  providing a query profiler having a taxonomy database;
  receiving a query from a user;
  accessing the taxonomy database of the query profiler to identify a plurality of codes that are relevant to the query;
  augmenting the query using the codes to generate feedback information to the user for query refinement, the feedback information including a plurality of query terms associated with the query and to be selected by the user;
  presenting the feedback information to the user;
  receiving one of the query terms from the user; and
  identifying a source of the query term and presenting to the user.

Still in one embodiment of the present invention, the taxonomy database of the query profiler comprises a timing identifier for identifying a timing range, wherein the method further comprises receiving the query with a time range and identifying the source of the query term with the time range.

Further in one embodiment of the present invention, the taxonomy database of the query profiler comprises a query term ranking module, wherein the module provides a relevance score corresponding to the number of times the query term appears in documents containing the corresponding code and the number of documents for which the query term and the corresponding code appear together.

Further, in one embodiment of the present invention, an intelligent search and retrieval system comprises:
  a query profiler having a taxonomy database to be accessed upon receiving a query from a user, which identifies a plurality of codes that are relevant to the query;
  means for augmenting the query, using the codes to generate feedback information, the feedback information including a plurality of query terms associated with the query; and
  means for identifying a source of the query term and presenting to the user, upon receiving one of the query terms.

In another embodiment of the present invention, an intelligent search and retrieval system comprises:
  a query profiler having a taxonomy database to be accessed upon receiving a query from a user, which identifies a plurality of codes that are relevant to the query;
  means for augmenting the query, using the codes to generate feedback information to the user for query refinement, the feedback information including a plurality of query terms associated with the query and to be selected by the user; and means for identifying a source of the query term, upon receiving one of the query terms from the user.

Still in one embodiment of the present invention, the taxonomy database of the query profiler comprises a timing identifier for identifying a timing range, wherein the method further comprises receiving the query with a time range and identifying the source of the query term with the time range.

Further in one embodiment of the present invention, the taxonomy database of the query profiler comprises a query term ranking module, wherein the module provides a relevance score corresponding to the number of times the query term appears in documents containing the corresponding code and the number of documents for which the query term and the corresponding code appear together.

While multiple embodiments are disclosed, still other embodiments of the present invention will become apparent to those skilled in the art from the following detailed description, which shows and describes illustrative embodiments of the invention. As will be realized, the invention is capable of modifications in various obvious aspects, all without departing from the spirit and scope of the present invention. Accordingly, the drawings and detailed description are to be regarded as illustrative in nature and not restrictive.

DETAILED DESCRIPTIONS OF THE PREFERRED EMBODIMENT

The present invention provides an intelligent search and retrieval system and method capable of providing an end-user access, via simplistic queries, to relevant, meaningful, up-to-date, and precise search results as quickly and efficiently as possible.

Definitions of certain terms used in the detailed descriptions are as follows:

| Term | Definition |
| --- | --- |
| Boolean Query | Query expressions containing such terms as "and", "or", "not", etc. that contain the exact logic of how the query is to be evaluated, potentially including source and language restrictions and date ranges. |
| End-user | An individual who has some experience and confidence with Internet search engines but is not an Information Professional. |
| Entity Extractor | Component which identifies phrases, such as noun phrases, compound words or company names within a string of text. |
| Information Professional | A user who has extensive training and/or experience in using online information services to locate information. Information Professionals are typically comfortable with advanced search techniques such as complex Boolean queries. |
| IQ | Intelligent Query |
| IQ Digester | Service which reads large volumes of text and generates statistical tables or digests of the information contained therein. |
| IQ Profiler | Service which accepts simple queries and transforms them to a list of likely Boolean queries using taxonomy data and the search engine's syntax. |
| Phrase | Any word or phrase as identified by the Entity Extractor or query parser. |
| Simple query | A query comprised of a few words or phrases, potentially using the simple query conjunctions "and", "or" and "not". |
| Taxonomy | The classification and markup (coding) of documents based on its contents or on other criteria, such as the document source. |

Figure 1:
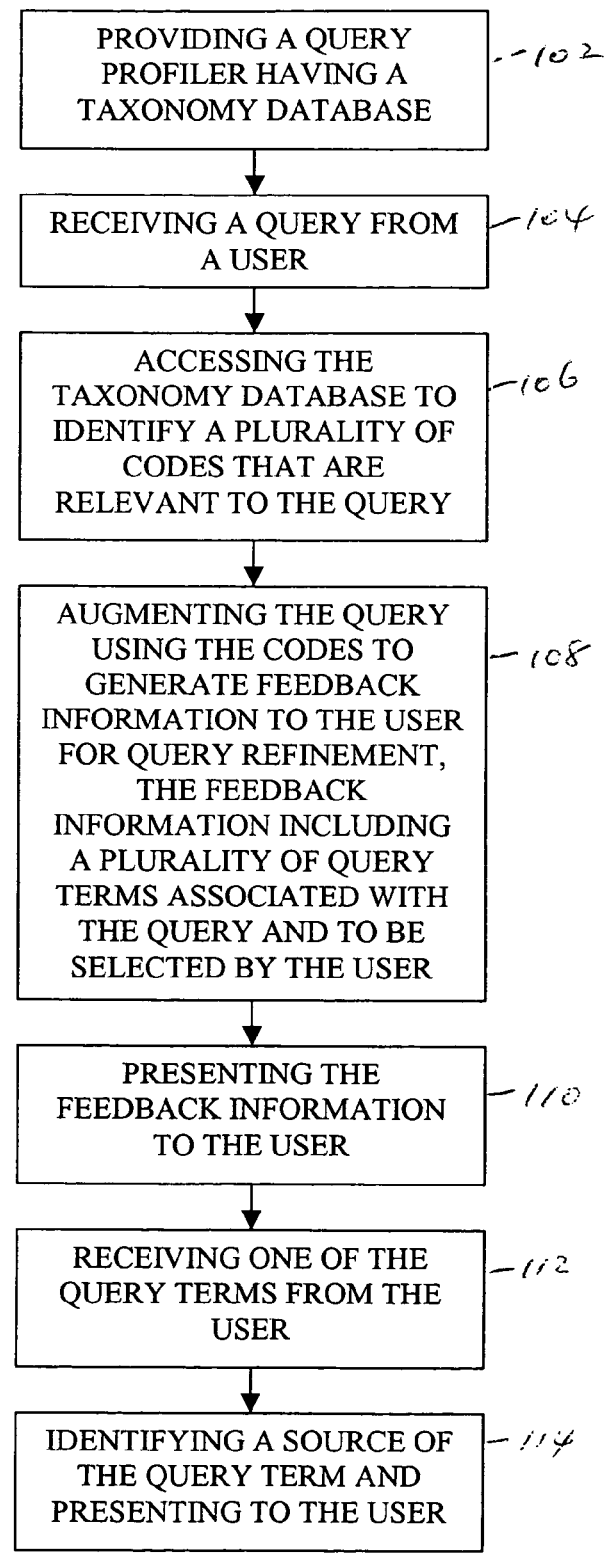
FIG. 1 illustrates a flow chart of one embodiment of an intelligent search and retrieval method, in accordance with the principles of the present invention.

Referring to FIG. 1, one embodiment of an intelligent search and retrieval process 100, in accordance with the principles of the present invention, is illustrated. The process 100 starts with providing a query profiler having a taxonomy database in step 102. Upon receiving a query from a user in step 104, the taxonomy database is accessed to identify a plurality of codes that are relevant to the query in step 106. Then, the query is augmented by using the codes in step 108, which generates feedback information to the user for user's further refinement. The feedback information includes a plurality of query terms associated with the query and to be selected or further refined by the user. The feedback information is presented to the user in step 110. Upon receiving one of the query terms selected by the user in step 112, a source of the selected query term is identified in step 114 and presented to the user. It is appreciated that in one embodiment, there may be no interaction between the user and the interface after the query is run, or i.e. there need not always be an interaction between the user and the interface after the query is run. The system has a high enough degree of certainty to run the augmented query directly and offer the user a chance to change a query after results are returned.

Also in FIG. 1, the taxonomy database of the query profiler may include a timing identifier for identifying a timing range, wherein the process 100 may further include a step of receiving the query with a time range and identifying the source of the query term with the time range.

Further, in FIG. 1, the taxonomy database of the query profiler may include a query term ranking module, wherein the module provides a relevance score corresponding to the number of times the query term appears in documents containing the corresponding code and the number of documents for which the query term and the corresponding code appear together.

Figure 2:
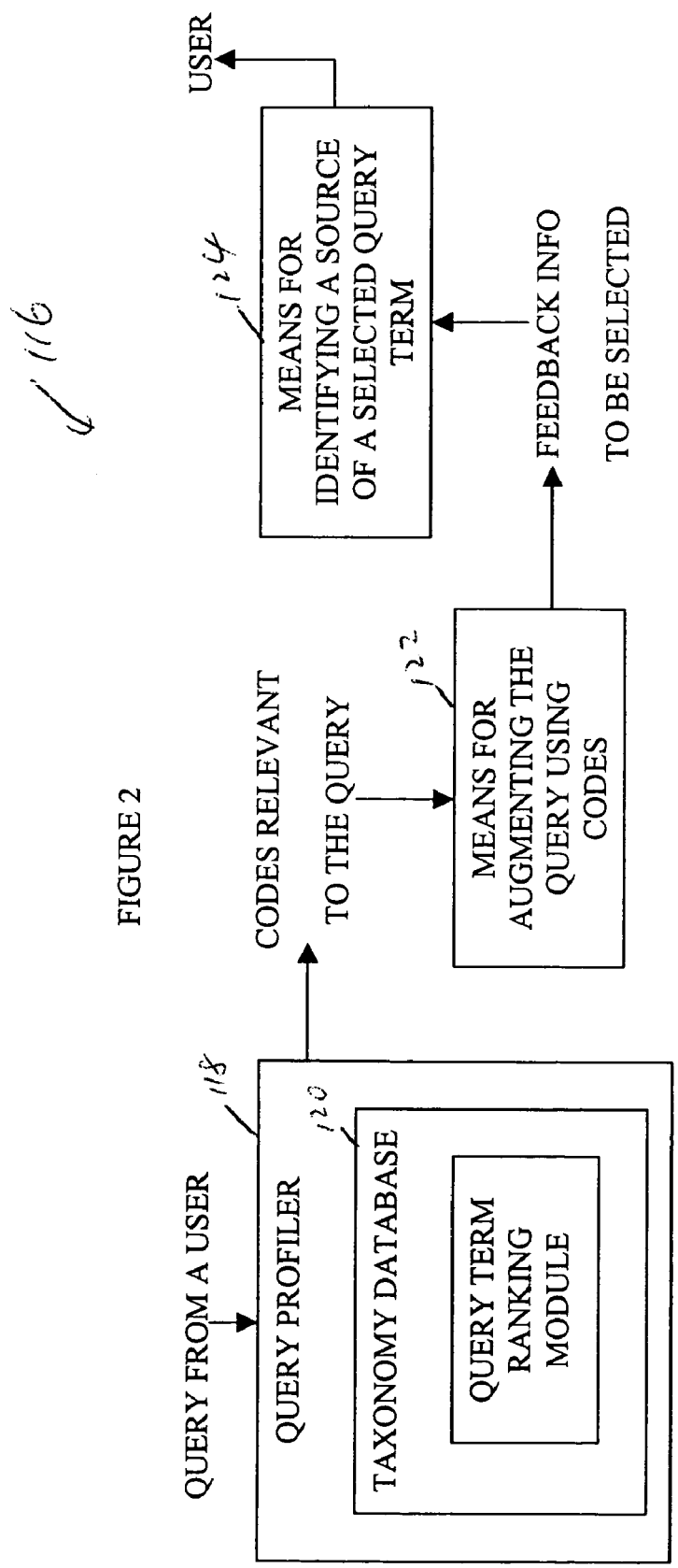
FIG. 2 illustrates a block diagram of one embodiment of an intelligent search and retrieval system, in accordance with the principles of the present invention.

FIG. 2 illustrates one embodiment of an intelligent search and retrieval system 116 in accordance with the principles of the present invention. The intelligent search and retrieval system 116 includes a query profiler 118 having a taxonomy database 120 to be accessed upon receiving a query from a user. The taxonomy database 120 identifies a plurality of codes that are relevant to the query. The system 116 further includes means 122 for augmenting the query using the codes to generate feedback information to the user for query refinement. The feedback information may include a plurality of query terms associated with the query and to be selected by the user. The system 116 also includes means 124 for identifying a source of the query term, upon receiving one of the query terms from the user.

Exemplary System Architecture

An exemplary system architecture of one embodiment of the intelligent search and retrieval system is explained as follows. The architecture may be comprised of two subsystems: an IQ Digester and an IQ Profiler. The IQ Digester maps the intersection of words and phrases to the codes and produces a digest of this mapping, along with an associated set of scores. The IQ Digester is a resource-intensive subsystem which may require N-dimensional scale (e.g. CPU, RAM and storage). The IQ Profiler accesses the IQ Digester and serves as an agent to convert a simple query into a fully-specified query. In one embodiment, the IQ Profiler is a lightweight component which runs at very high speed to convert queries in near-zero time. It primarily relies on RAM and advanced data structures to effect this speed and is to be delivered as component software.

System Components

In one embodiment, the IQ Digester performs the following steps:
1. For each categorized document
  a. Parse the natural language from the document.
  b. Parse the associated taxonomy codes into a data structure (CS).
  c. Filter unnecessary or undesirable code elements from the CS.
  d. Extract phrases from the document text, sorting and collating them into a counted phrase list (CPL).
  e. Insert the mapping of CPL→CS into an appropriate set of database tables. The table containing the actual mapping of phrases to codes and their counts are referred to as the Phrase-Code-Document Frequency table (PCDF).

2. On a scheduled basis, a digest mapping is collected. This mapping may contain the following items:
  a. An XML document containing the one-to-many relationship of {language-phrase}→{code-document-frequency-score} (IQMAP).
  b. Only relations exceeding a certain minimum threshold are included in the digest. This threshold is to be determined but may take the form of minimum score, top-N entries or a combination of the two.
  c. A discrete mapping of explicit alias phrases, such as company legal names, are mapped 1-to-1 with the taxonomy code for that organization. This section of the document includes only phrases whose associated codes appear in more than a certain minimum threshold of documents.

3. A copy of this digest is reserved for a future date to be run against the Digester database as a "delete." This has the effect of purging old news stories from the Digester database. The time window for deletion is to application dependent.

Phrasal Analysis Techniques

The IQ Digester uses linguistic analysis to perform "optimistic" phrase extraction. Optimistic phrase extraction is equivalent to very high recall with less emphasis on precision. This process produces a list of word sequences which are likely to be searchable phrases within some configurable confidence score. The rationale behind optimistic phrase identification is to include as many potential phrases as possible in the IQ Digest database. Although this clutters the database with word sequences that are not phrases, the IQMAP's scoring process weeds out any truly unrelated phrases. Their phrase→code score are statistically insignificant.

Intelligent Queries using the PCF-IPCDF Module

The TF-IDF (Term Frequency-Inverse Document Frequency) module provides relevance ranking in full-text databases. Phrase-Code Frequency-Inverse Phrase-Code Document Frequency (PCF-IPCDF) module in accordance with the present invention selects the codes for improving user searches. The system outputs the codes or restricts sources of the query and thereby improve very simply specified searches.

Definitions of certain terms are as follows:

| | |
|---|---|
| Phrase-code frequency (pcf) | $pcf(p, c)$ is the number of times phrase p appears in documents containing code c. |
| Inverse Phrase-Code Document Frequency (ipcdf) | $ipcdf = \log \frac{D(c)}{df(p, c)}$ where $D(c)$ is the number of documents coded with c and $df(p, c)$ is the number of documents for which the phrase p and code c appear together. |
| Phrase | A word or grammatical combination of words, such as a person's name or geographic location, as identified by a linguistic phrase extraction preprocessor. |
| Score | $s(p, c) = pcf(p, c) \cdot ipcdf(p, c)$ |

Linguistic Analysis and Processing

Phrase extraction via linguistic analysis may be required at the time of document insertion and query processing. Phrase extraction in both locations produce deterministic, identical outputs for a given input. Text normalization, referred to as "tokenization," is provided. This enables relational databases, which are generally unsophisticated and inefficient in text processing, to be both fast and deterministic.

Tabular Data

The following tables map phrases to codes, while recording phrase-code occurrence frequencies, phrase-code document frequencies and total document count.

Codes

| cat | code | code_id | upa | depth | df |
|---|---|---|---|---|---|
| in | i1 | 20 000 | ROOT | 0 | 7 500 |
| in | gcat | 40 000 | ROOT | 0 | 9 001 |
| in | iacc | 20 400 | i1 | 1 | 5 800 |
| pd | pd | 20030401 | pd | 0 | 150 000 |

Counts

| doc_count | last_seq |
|---|---|
| 7 213 598 | 7 213 |

Phrases

| la | phrase | phrase_id |
|---|---|---|
| en | george bush | 183 |
| en | enron | 21 |

Combinations

| Phrase_id | code_id | pcf | df | s |
|---|---|---|---|---|
| 183 | 40 000 | 8 394 | 921 | 32 685 |
| 183 | 20 000 | 61 | 59 | 310 |
| 21 | 40 000 | 2 377 | 546 | 9 796 |
| 21 | 20 000 | 4 827 | 2 301 | 16 876 |

Identifying Key Metadata and Phrases

The IQ Database's purpose is to tie words and phrases to the most closely related metadata, so as to focus queries on areas which contain the most relevant information. To be efficient in processing documents, the IQDB inserter may require a per-language list of stop words and stop codes. The stop word list is likely a significantly expanded superset of the typical search engine stop word list, as it eliminates many words which do not capture significant "aboutness" or information context. As opposed to traditional stop word lists which often contain keywords of significance to the search engine (e.g. "and", "or"), the stop word list is populated more by the frequency and diffusion of the words—words appearing most frequently and in most documents (e.g. "the") are statistically meaningless. Use of the language-specific stop lists on the database insertion side may obviate the need to remove stop words on the query side, since they have zero scores on lookup in the IQ database. There are regions of an Intelligent Indexing map which are so broad as to be meaningless, such as codes with parent or grandparent of ROOT. For processing and query efficiency, these codes must be identified and discarded.

Once stop words and stop codes have been eliminated, a calculation is needed to isolate the "deepest" code from each branch contained within a document. Though the indexing is defined as a "polyarchy" (meaning that one taxonomic element (a.k.a. code) can have more than one parent, it can be transformed into a directed acyclic graph (a.k.a. a tree) via element cloning. That is, cycles can be broken by merely cloning an element with multiple parents into another acyclic element beneath each of its parents. By then noting each element's ultimate parent(s) and its depth beneath that parent, the deepest code for each root element of the tree can be isolated. In cases where a code has multiple ultimate parents, both ultimate parents may need to be identified and returned in the IQMAP. This maximizes concentration of data points around single, specific taxonomic elements, and prevents diffusion, which is likely to weaken query results.

Also, choosing which codes to use and which to discard is accomplished by an originator of the code. There are numerous methods of applying codes. Some reflect documents' contextual content (natural language processing and rules-based systems), while others merely map (taxonomy-based expansion and codes provided by a document's creator). Codes added by mapping create multicollinearity in the dataset, and weaken overall results by dilution.

Temporal Relevance

By keeping the IQ database content to a strictly limited time window and deleting data points as they fall outside the time window, the database actually tracks temporal changes in contextual meaning.

Database

Since related elements have an explicitly defined contextual relationship (e.g. Tax accounting is a child of Accounting, therefore they are contextually related), integer code identifiers may be assigned to codes in such a way that a clear and unambiguous spatial representation of word-code relationships can be visualized. By assigning code identifiers (that is, putting sufficient empty space between unrelated code identifiers), clear visual maps can be created. For Example:

| Code | Description | Code ID | Note |
|---|---|---|---|
| i1 | Accounting/Consulting | 20 500 | ROOT code |
| iacc | Accounting | 20 400 | Child of i1 |
| icons | Consulting | 20 600 | Child of i1 |
| iatax | Tax Accounting | 20 350 | Child of iacc |
| i2 | Agriculture/Farming | 30 500 | ROOT code |
| i201 | Hydroponics | 20 400 | Child of i2 |
| i202 | Beef Farming | 20 600 | Child of i2 |

By condensing identifiers for semantically-related codes and diffusing identifiers for unrelated codes, it visualizes the clustering of certain words around certain concepts using a three-dimensional graph of (p, c, s) where p is the phrase identifier, c is the code identifier and s is the modified TFIDF score.

Figure 3:
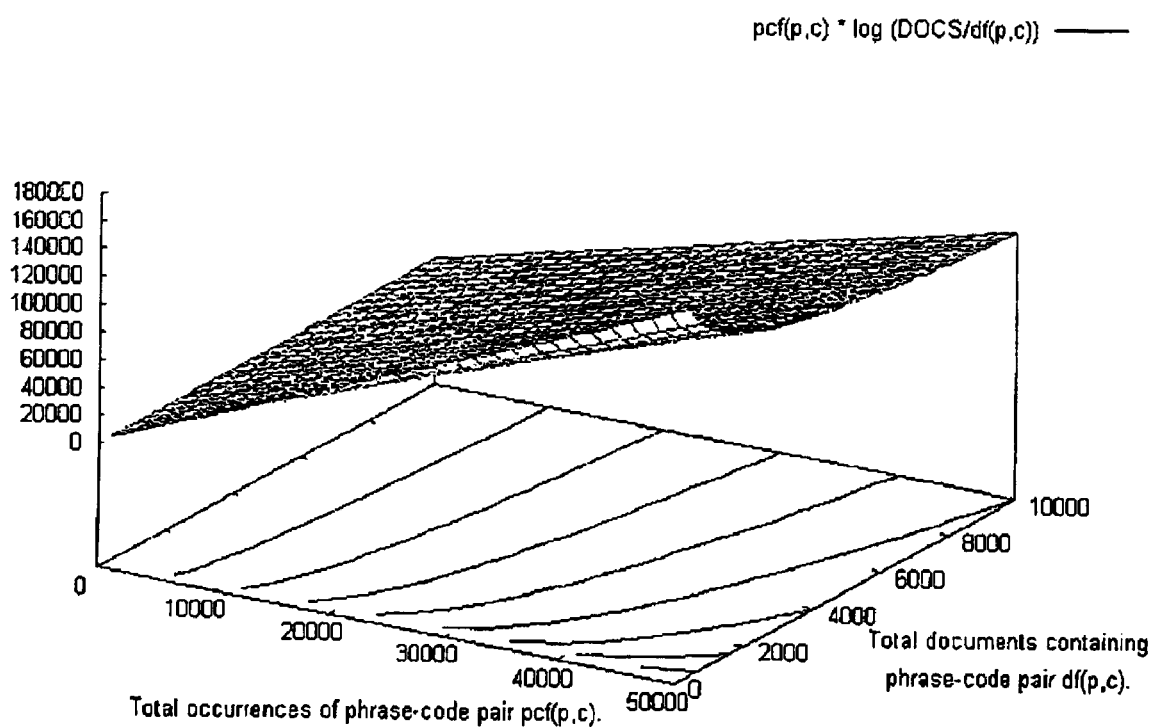
FIG. 3 shows a graphical view of the Phrase-Code Scoring Pair calculation.

FIG. 3 shows a graphical view of the Phrase-Code Scoring Pair calculation.

This calculation encodes the following principles:

1. If the number of documents containing a phrase-code pair is held constant, phrases which occur more frequently will score higher.

2. If the number of occurrences a phrase is held constant, phrase-code pairs which appear in fewer documents will score higher.
3. In other words, given a phrase, for two codes, if an equal number of phases appear (pcf held constant), then the phrase-code pair which appears in fewer documents will be assigned a higher score (pcdf decreasing).

One of the advantages of the present invention is that it provides end-users effortless access yet the most relevant, meaningful, up-to-date, and precise search results, as quickly and efficiently as possible.

Another advantage of the present invention is that an end-user is able to benefit from an experienced recommendation that is tailored to a specific industry, region, and job function, etc., relevant to the search.

Yet another advantage of the present invention is that it provides a streamlined end-user search screen interface that allows an end user to access resources easily and retrieve results from a deep archive that includes sources with a historical, global, and local perspective.

Further advantages of the present invention include simplicity, which reduces training time, easy accessibility which increases activity, and increased relevance which allows acceleration of decision making.

These and other features and advantages of the present invention will become apparent to those skilled in the art from the attached detailed descriptions, wherein it is shown, and described illustrative embodiments of the present invention, including best modes contemplated for carrying out the invention. As it will be realized, the invention is capable of modifications in various obvious aspects, all without departing from the spirit and scope of the present invention. Accordingly, the above detailed descriptions are to be regarded as illustrative in nature and not restrictive.

What is claimed is:

1. An intelligent search and retrieval method, comprising the steps of:
   providing a query profiler having a taxonomy database, the taxonomy database including a plurality of taxonomy codes which have explicitly defined contextual relationship and are semantically related;
   receiving a query from a user;
   accessing the taxonomy database of the query profiler to identify the taxonomy codes that are relevant to the query;
   wherein taxonomy codes are identified using a phrase-code frequency-inverse phrase-code document frequency (pcf-ipcdf) score:
   wherein phrase-code frequency, pcf(p,c), is defined as a number of times a phrase p appears in one or more categorized documents containing a code c;
   wherein inverse phrase-code document frequency, ipcdf, is defined as the logarithm of: a number of the documents coded with code c, D(c), divided by a number of the documents for which the phrase p and code c appear together, df(p,c);
   wherein the pcf-ipcdf score, s(p,c), is defined as pcf(p,c) multiplied by ipcdf(p,c);
   augmenting the query using the taxonomy codes;
   generating feedback information to the user for query refinement, the feedback information including a plurality of query terms associated with the query and to be selected by the user;
   presenting the feedback information to the user;
   receiving one of the query terms from the user; and
   identifying a source of the query term and presenting to the user;
   wherein the taxonomy database is generated by:
      parsing the natural language from the one or more categorized documents;
      parsing one or more associated taxonomy codes into a data structure;
      filtering unnecessary or undesirable code elements from the data structure;
      extracting phrases from the text of the one or more categorized documents;
      sorting and collating the extracted phrases into a counted phrase list; and
      mapping the counted phrase list and the one or more associated taxonomy codes into a data table.

2. The method of claim 1, wherein the taxonomy database of the query profiler comprises a timing identifier for identifying a timing rage, wherein the method further comprises receiving the query with a time range and identifying the source of the query term with the time range.

3. The method of claim 1, wherein the taxonomy database of the query profiler comprises a query term ranking module, wherein the module provides a relevance score corresponding to the number of times the query term appears in the documents containing the corresponding taxonomy code and the number of documents for which the query term and the corresponding taxonomy code appear together.

* * * * *